United States Patent Office 2,938,443
Patented May 31, 1960

2,938,443
ROLLFILM CAMERA

Willi Günther, Stuttgart-Mohringen, and Albert Böpple and Johann Hahn, Stuttgart, Germany, assignors to Zeiss Ikon A.G. Stuttgart, Stuttgart, Germany Filed Oct. 14, 1958, Ser. No. 767,230

Claims priority, application Germany Oct. 29, 1957

4 Claims. (Cl. 95—31)

The invention relates to improvements in rollfilm cameras provided with a removable rear wall, which rear wall is constructed as an exchangeable film magazine. In cameras of this type the rear wall has mounted thereon not only the yieldably supported film pressure plate, but also the film supply spool and the film advancing spool, as for instance is described in U.S. Patent No. 2,810,330, issued October 22, 1957.

In the construction according to the mentioned U.S. patent, the film magazine is supported in a chamber provided at one end of the rear wall of the camera casing in such a manner that the film spool with its hollow shaft, which projects from the magazine, is received in a suitable recess provided in the bottom wall of the chamber. The opposite end of the hollow shaft of the spool, which is provided with a transverse coupling bar, is, however, not guided in the magazine receiving chamber of the rear wall of the camera casing. Such an arrangement has the disadvantage that, when the magazine is removed from the camera, the film in the magazine will be exposed to the light, which may enter the magazine housing, for instance, through a small slot between the film spool and the housing. The light may also enter the magazine housing through the normally sealed film discharge opening of the magazine, particularly after an extensive use of the same.

In order to eliminate the above described disadvantages, the rollfilm camera of the present invention is designed in such a manner that the film magazine inserted into the camera is protected by a cover which engages grooves, recesses or the like, provided in the walls forming the chamber for receiving the magazine. This cover is formed in such a manner that the same will enclose light-tight the exposed circumference, as well as the exposed end face of the film magazine.

Figure 1:
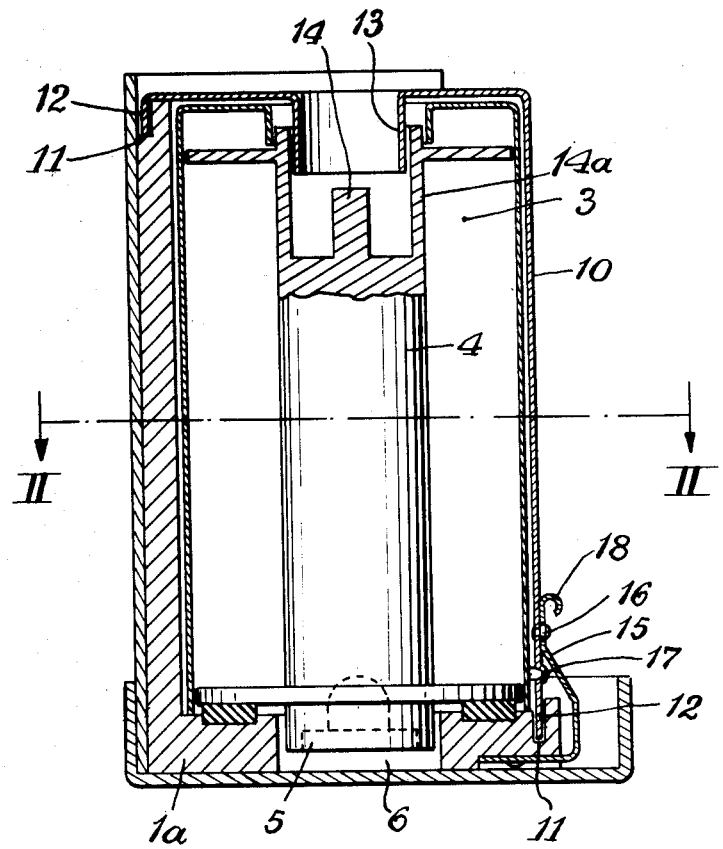
Figure 2:
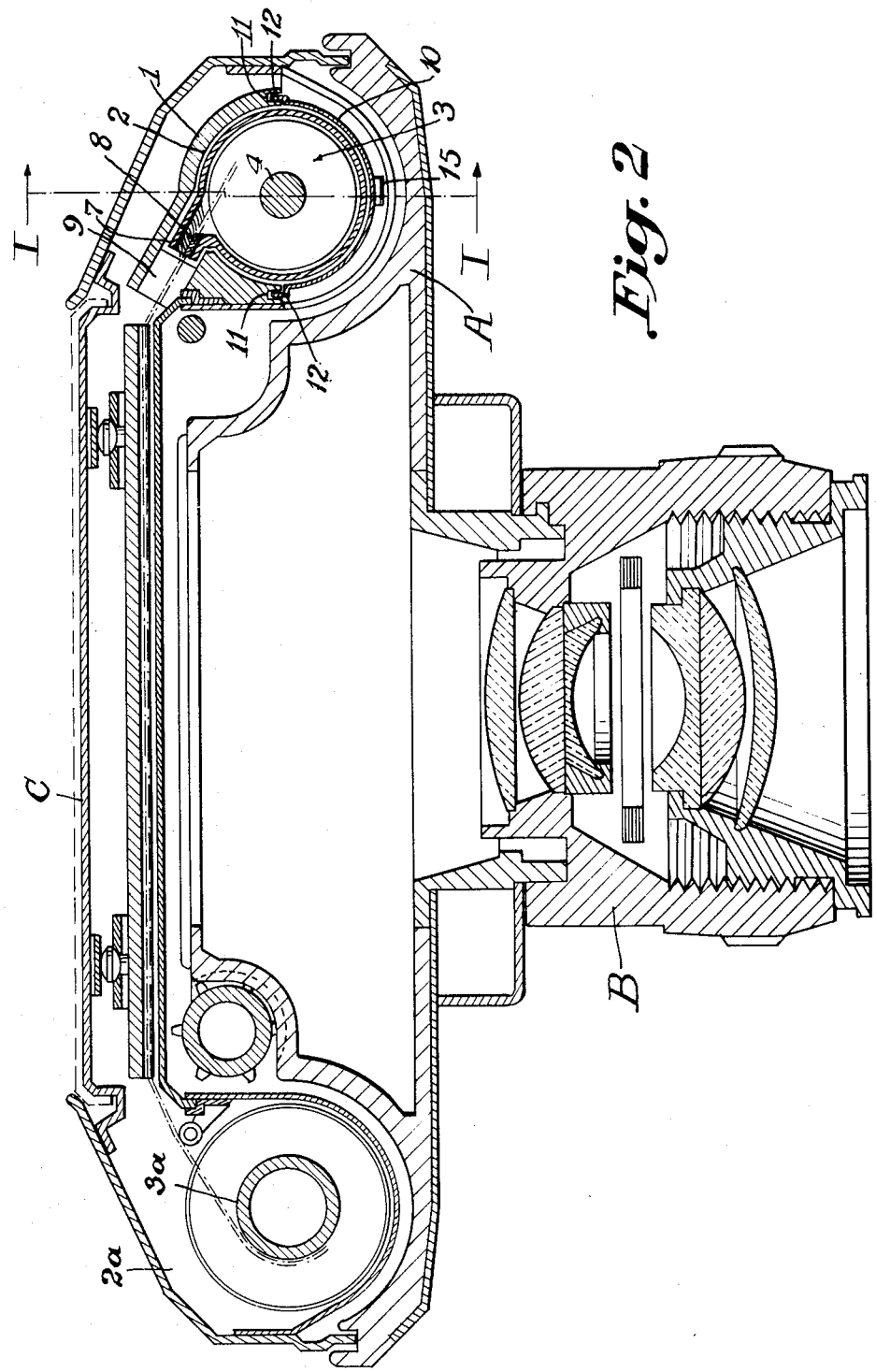

The invention will now be described in the following description with reference to the accompanying drawing, in which Fig. 1 is a longitudinal section of the film magazine receiving chamber of a rollfilm camera with a film magazine inserted in said chamber, substantially along the lines I—I of Fig. 2, and Fig. 2 is a horizontal sectional view of the rollfilm camera along the line II—II of Fig. 1.

Referring to the drawing, Fig. 2 illustrates in a horizontal cross-sectional view of the rollfilm camera taken in a plane containing the optical axis of the camera objective B. The rollfilm camera is of the type in which the camera casing A is provided with a removable rear wall C. This rear wall C is constructed in the form of an exchangeable film magazine holder and also carries a film advancing mechanism. For this purpose one end of the rear wall C is provided with a film magazine chamber 2 and the other end with a chamber 2a in which a film advancing spool 3a is arranged. The film magazine 3 is placed in the semi-cylindrical chamber 2 formed by a curved wall 1 at one end of the removable rear wall C of the camera casing A. The outer portion 5 of the shaft of the film spool 4 which projects from the magazine 3, extends into a recess formed in the bottom wall 1a of the chamber 2. The curved wall 1 encloses the film magazine 3 semi-circularly and between its ends is provided a rectangular recess, into which extends the film discharge nozzle 7 with the film discharge slot 8 of the film magazine 3. The thus determined position of the film magazine will place its film discharge slot 8 directly opposite the inlet opening 9 of the film guide provided in the removable rear wall C. When the magazine 3 is pressed by spring pressure or the like with its discharge slot 8 directly against the film guide 9, any light from the outside will be prevented from reaching the surface of the film strip which is discharged from the magazine and enters into the film guide in the rear wall of the camera casing. If, however, the magazine should be slightly displaced or tilted in the chamber 1, the film strip will be exposed to the exterior light at the transfer point of the film strip between the magazine and the film guide and, furthermore, it may also happen that the light will enter the magazine through a slot formed between the film spool shaft and the adjacent end wall of the magazine.

In order to obtain a complete seal against light and to protect the film in the magazine 3 against undesired exposure, the entire magazine in the exchangeable rear wall C is protected by a light-tight cover 10. This cover 10 encloses fully the exposed circumference and the exposed upper end wall of the magazine 3 and for this purpose the cover is caused to engage with its edges 11 the groove-shaped recesses provided in the walls of the chamber 2. These groove-shaped recesses 11 are provided on the vertical front sides of the walls forming the chamber 2 and also on the horizontal wall portions of the same, so that the cover 10 with a suitably reinforced or beaded edge 12 can be inserted in these groove-shaped recesses. The cover 10 is provided on its upper end, which covers the end wall of the magazine 3, with a concentrically disposed, inwardly projecting collar 13. This collar 13 extends a certain distance into the upper hollow shaft portion 14a of the film spool 4 and, therefore, encloses the magazine 3 light-tight at this end. The inner diameter of the collar 13 is of such a size to permit the coupling member on the rewind knob of the camera to engage the transverse coupling bar 14 in the film spool 4 without difficulty.

In order to prevent an unintentional removal of the cover 10 from the removable rear wall C of the camera, a locking spring 15 is provided which projects upwardly from the bottom wall 1a of the chamber 1. This spring 15 snaps over a pin 16 provided on a suitable point of the cover 10. When the cover 10 is pushed onto the camera rear wall and over the magazine, a bead 17 provided on the semi-circular wall of the cover 10 pushes the end 18 of the leaf spring 15 outwardly, whereupon the pin 16 will enter an aperture in the leaf spring 15. The removal of the cover 10 from the magazine 3 and from the rear wall of the camera is only possible after the spring 15 is moved with its free end 18 away from the cover 10 until the pin 16 has been released by the spring 15.

What we claim is:

1. In a rollfilm camera, a camera casing, a removable rear wall for said camera casing, means on said rear wall forming a chamber for receiving a film magazine and also another chamber for receiving a film advancing spool so that said film magazine is removed with said rear wall when the latter is removed from said camera casing, said film magazine receiving chamber including a wall forming a substantially semi-circular chamber and a substantially semi-circular removable cover so as to form a circular chamber for receiving a rollfilm } magazine, said wall being provided with groove-shaped recesses to be engaged by the edges of said cover to form a chamber which is sealed against the admission of light.

2. In a rollfilm camera, a camera casing, a removable rear wall for said camera casing, means on said rear wall forming a chamber for receiving a film magazine and also another chamber for receiving a film advancing spool so that said film magazine is removed with said rear wall when the latter is removed from said camera casing, said film magazine receiving chamber including a wall forming a substantially semi-circular chamber and a substantially semi-circular removable cover so as to form a circular chamber for receiving a rollfilm magazine, said wall being provided with groove-shaped recesses to be engaged by the edges of said cover to form a chamber which is sealed against the admission of light, said cover being provided at one end of a substantially circular end wall having an inwardly extending circular collar arranged concentrically with respect to the axis of said film magazine receiving chamber, said film magazine including a film spool having a hollow shaft portion, said collar extending into one end of said hollow shaft portion.

3. In a rollfilm camera, a camera casing, a removable rear wall for said camera casing, means on said rear wall forming a chamber for receiving a film magazine and also another chamber for receiving a film advancing spool so that said film magazine is removed with said rear wall when the latter is removed from said camera casing, said film magazine receiving chamber including a wall forming a substantially semi-circular chamber and a substantially semi-circular removable cover so as to form a circular chamber for receiving a rollfilm magazine, said wall being provided with groove-shaped recesses to be engaged by the edges of said cover to form a chamber which is sealed against the admission of light, said film magazine receiving chamber having one substantially circular end wall with a recess to accommodate one end of the film spool which projects outwardly from the magazine, and a releasable locking device attached to said end wall and adapted to engage said cover and lock it in position when said cover has been attached to said rear wall in its operative position.

4. In a rollfilm camera, a camera casing, a removable rear wall for said camera casing, means on said rear wall forming a chamber for receiving a film magazine and also another chamber for receiving a film advancing spool so that said film magazine is removed with said rear wall when the latter is removed from said camera casing, said film magazine receiving chamber including a wall forming a substantially semi-circular chamber and a substantially semi-circular removable cover so as to form a circular chamber for receiving a rollfilm magazine, said wall being provided with groove-shaped recesses to be engaged by the edges of said cover to form a chamber which is sealed against the admission of light, said cover being provided at one end of a substantially circular end wall having an inwardly extending circular collar arranged concentrically with respect to the axis of said film magazine receiving chamber, said film magazine including a film spool having at one end a hollow shaft portion, said collar extending into one end of said hollow shaft portion, said film magazine receiving chamber having a substantially circular end wall with a recess therein to accommodate one end of the film spool which projects outwardly from the magazine, and a releasable locking device attached to said end wall and adapted to engage said cover and lock it in position when said cover has been attached to said rear wall in its operative position.

References Cited in the file of this patent

UNITED STATES PATENTS 2,575,024     Mihalyi _____ Nov. 13, 1951

FOREIGN PATENTS 1,133,512     France _____ Nov. 19, 1956